(12) United States Patent
De Nicolo

(10) Patent No.: US 11,974,693 B2
(45) Date of Patent: May 7, 2024

(54) BREWING DEVICE FOR A BEVERAGE PREPARATION MACHINE, IN PARTICULAR COFFEE OR TEA

(71) Applicant: CARIMALI S.P.A., Bergamo (IT)

(72) Inventor: Michele De Nicolo, Concorezzo (IT)

(73) Assignee: CARIMALI S.P.A., Bergamo (IT)

( * ) Notice: Subject to any disclaimer, the term of this patent is extended or adjusted under 35 U.S.C. 154(b) by 712 days.

(21) Appl. No.: 17/255,199

(22) PCT Filed: Jun. 27, 2019

(86) PCT No.: PCT/IB2019/055459
§ 371 (c)(1),
(2) Date: Dec. 22, 2020

(87) PCT Pub. No.: WO2020/003201
PCT Pub. Date: Jan. 2, 2020

(65) Prior Publication Data
US 2021/0401221 A1    Dec. 30, 2021

(30) Foreign Application Priority Data

Jun. 27, 2018  (WO) .................. PCT/IB2018/054765
Nov. 19, 2018  (IT) ........................ 102018000010433

(51) Int. Cl.
A47J 31/44    (2006.01)
A47J 31/36    (2006.01)

(52) U.S. Cl.
CPC ....... *A47J 31/4407* (2013.01); *A47J 31/3604* (2013.01); *A47J 31/3666* (2013.01)

(58) Field of Classification Search
CPC ................ A47J 31/3604; A47J 31/3614; A47J 31/3623; A47J 31/3633; A47J 31/3666;
(Continued)

(56) References Cited

U.S. PATENT DOCUMENTS 7,131,369 B2 * 11/2006 Gantt .................... A47J 31/368
99/302 R
7,320,274 B2 *  1/2008 Castellani ........... A47J 31/0673
99/302 R
(Continued)

FOREIGN PATENT DOCUMENTS

WO     2007006184 A1    1/2007

OTHER PUBLICATIONS

International Search Report dated Feb. 10, 2020 for PCT application No. PCT/IB2019/055459.
(Continued)

*Primary Examiner* — Hung D Nguyen
(74) *Attorney, Agent, or Firm* — Ruggiero McAllister & McMahon LLC

(57) ABSTRACT

A brewing device for a beverage preparation machine, in particular coffee or tea, the brewing device includes a frame, a brewing chamber carried by the frame and having a longitudinal axis and a loading/unloading aperture for a brewable material, a closing body movable relative to the frame from and to a closing position for the aperture, and an actuator device to move the closing body. The brewing device further includes a motor and a transmission arranged between the motor and the closing body; the transmission includes a rack-and-pinion mechanism including a driving toothing carried by the frame, and a driven toothing carried by the closing body and meshing with the driving toothing to move the closing body from and to its closing position.

9 Claims, 6 Drawing Sheets

(58) Field of Classification Search
CPC .. A47J 31/3676; A47J 31/368; A47J 31/3685; A47J 31/369; A47J 31/40; A47J 31/405; A47J 31/407; A47J 31/4403; A47J 31/4407; A47J 31/446; A47J 31/4471
See application file for complete search history.

(56) References Cited

U.S. PATENT DOCUMENTS

| | | | | |
|---|---|---|---|---|
| 8,402,882 | B2* | 3/2013 | De'Longhi | A47J 31/3614 99/289 R |
| 8,701,548 | B2* | 4/2014 | Denisart | A47J 31/3676 99/289 R |
| 9,980,600 | B2* | 5/2018 | Hale | A47J 31/4407 |
| 2007/0017375 | A1* | 1/2007 | Chen | A47J 31/3666 99/279 |
| 2014/0033927 | A1 | 2/2014 | Hale | |
| 2015/0056343 | A1* | 2/2015 | Mori | A47J 31/4403 99/295 |

OTHER PUBLICATIONS

Written Opinion dated Feb. 10, 2020 for PCT application No. PCT/IB2019/055459.

* cited by examiner

BREWING DEVICE FOR A BEVERAGE PREPARATION MACHINE, IN PARTICULAR COFFEE OR TEA

CROSS-REFERENCE TO RELATED PATENT APPLICATIONS

This application claims priority under 35 U.S.C. § 119(a) to Italian Patent Application No. 102018000010433 filed on Nov. 19, 2018 and of International Patent Application No. PCT/IB2018/054765 filed on Jun. 27, 2018 and published on Jan. 1, 2019 with the number WO 2019/003146, and is a national stage application under 35 U.S.C. § 371, of PCT/IB2019/055459 filed on Jun. 27, 2019 the contents of all of which are incorporated by reference herein in their entirety.

BACKGROUND OF THE DISCLOSURE

1. Field of the Disclosure

The present invention relates to a brewing device for a beverage preparation machine, in particular coffee or tea.

2. Description of the Related Art

The present invention relates to a brewing apparatus of the type comprising a brewing chamber having a loading/unloading aperture for a brewable material; a frame having two lateral walls arranged on opposite sides of the brewing chamber and two fulcrum pins coaxial to each other and projecting outwards from the lateral walls; a closing body movable relative to the frame, away from and towards a closing position in which the closing body fluid-tightly closes the aperture of the brewing chamber and comprising two guide plates, each of which faces a respective side wall and has a slot slidingly engaged by a respective fulcrum pin; a piston slidably mounted in the brewing chamber in a position axially opposite the closing body; an actuating device suitable for moving the closing body and comprising a motor and a transmission arranged between the motor and the closing body.

Normally, the above-mentioned transmission consists of a plurality of cams that cooperate to move the closing body to and from its closing position in a controlled manner, according to a given law of motion.

A brewing device of the type specified above is described, for example, in the Italian patent application 102017000071863 of the same Applicant, the entire contents of which are incorporated herein for reference.

US 20140/33927 A1 discloses a head assembly for a brewing apparatus comprising a lid portion coupled to a fixed base portion and movable between open and closed positions; a lock coupled to the lid portion and slideable between locked and unlocked positions; a lever with a first end connected to the lock, an axis point connected to the lid portion, and a second end; and a cover movably coupled to the lid portion and abutting the second end of the lever, such that pressure on the cover rotates the lid portion to the closed position, and rotates the lever so as to slide the lock into the locked position.

WO 2007/006184 A1 discloses a cover opening device for electric water bottle or coffeepot including a cover main body, a locking member, a startup member and a driving member. The back end of the cover main body is pivoted on bottle body. The locking member is mounted movably on the cover main body and is meshed with corresponding locking mechanism on the bottle body. The startup member is connected with the locking member via the driving member, is provided with a rotating shaft and is pivoted on the cover main body. The driving member is a set of toothed piece and toothed rack which are meshed, the toothed piece is connected fixedly with the rotating shaft of the startup member, the toothed rack is set on the locking member, the toothed piece is meshed with the toothed rack. During the process of lifting a handle, the cover is unlocked and opened successively by the meshing of the toothed piece and toothed rack.

The Applicant has been able to observe that while the brewing apparatuses that are provided with cam transmissions manufactured according to the known art are satisfactory in many respects, they have great room for improvement in terms of controlling the movement of the closing body, in particular for the purpose of greater precision of the trajectories and of the final positions reached by the closing body.

SUMMARY OF THE INVENTION

The purpose of the present invention is to provide a brewing device of the above-mentioned type, which introduces improvements that allow a more precise, more reliable, and more easily controlled movement of the brewing device's closing body to be achieved.

According to this invention a brewing device and a beverage preparation machine comprising such brewing device are provided, as claimed in the appended claims.

DETAILED DESCRIPTION

A detailed description of this invention will now be given with reference to the enclosed Figures to allow a person skilled in the art to implement it and use it. Various modifications to the described embodiments will be readily apparent to a person skilled in the art and the general principles described may be applied to other embodiments and applications without however departing from the protective scope of the present invention, as defined in the appended claims. Accordingly, the present invention is not to be limited in scope to the embodiments described and illustrated herein, but is to be accorded with the widest scope consistent with the principles and characteristics disclosed and claimed herein.

Figure 1:
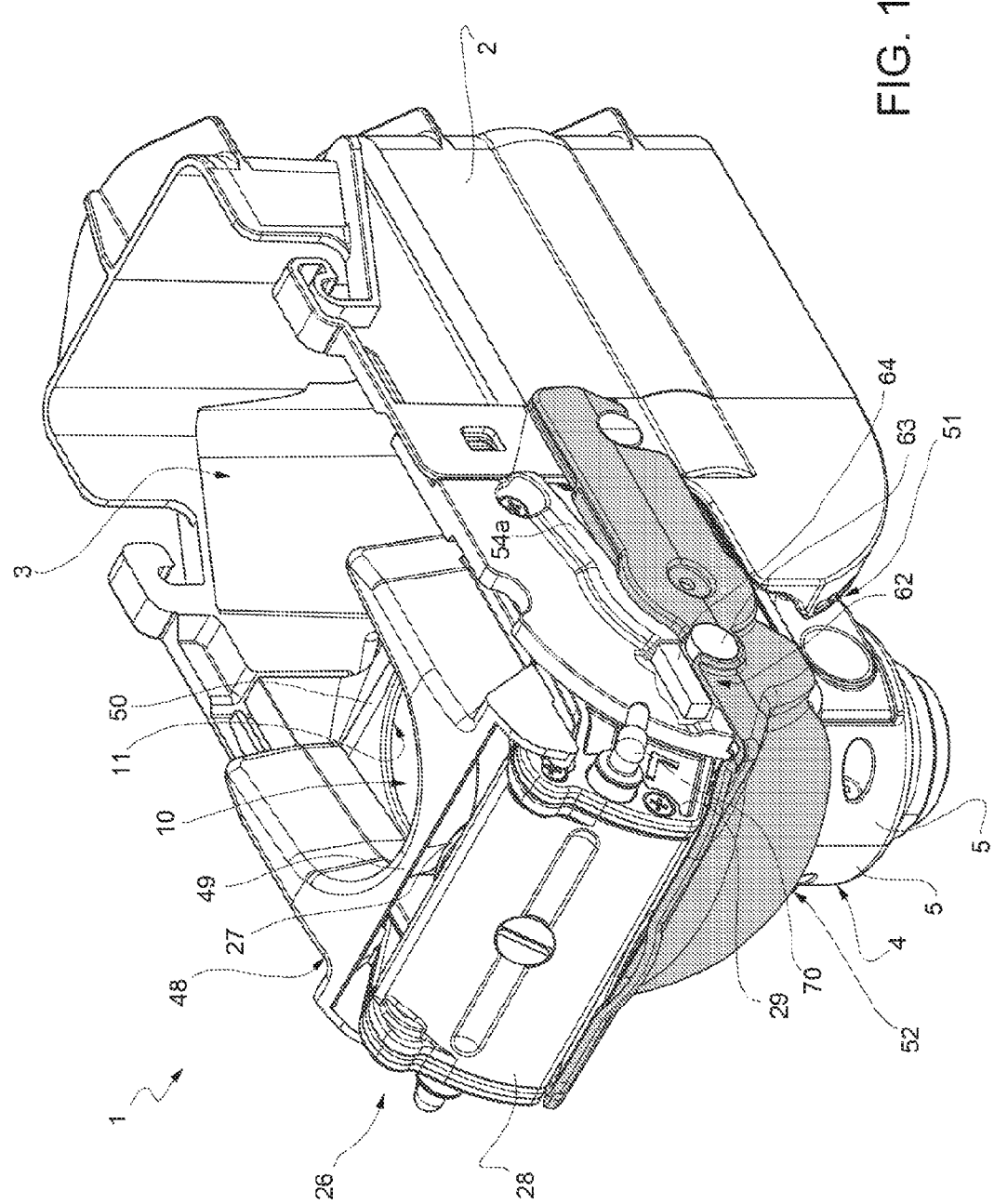
FIG. 1 is a perspective view of a preferred embodiment of the brewing device, according to the present invention, arranged in an open configuration and mounted on a support which is part of a for a beverage preparation machine.

FIG. 1 shows, as a whole, a brewing device for preparing beverages, in particular coffee or tea, through an extraction process with pressurized hot water in a machine for preparing beverages.

Under normal operating conditions the brewing device 1 is arranged inside a machine for producing beverages and is associated with a pressurised hot water source and an automatic supply device suitable to provide to the brewing apparatus 1, at the beginning of a brewing cycle, a dosed quantity of material to be brewed, for example coffee powder or tea leaves. According to a variation, the material supply can occur manually through the loading, by a user, of a dose of bulk material or of a pod or a single-dose capsule of the known type.

In accordance with what is shown in FIG. 1, the brewing device 1 is releasably hooked to a support body 2, which holds the power take-offs suitable for actuating, as mentioned below, the movable components of the brewing device 1 and furthermore defines a discharge channel 3 for the used material that is ejected from the brewing device 1 at the end of each beverage preparation cycle.

Figure 2:
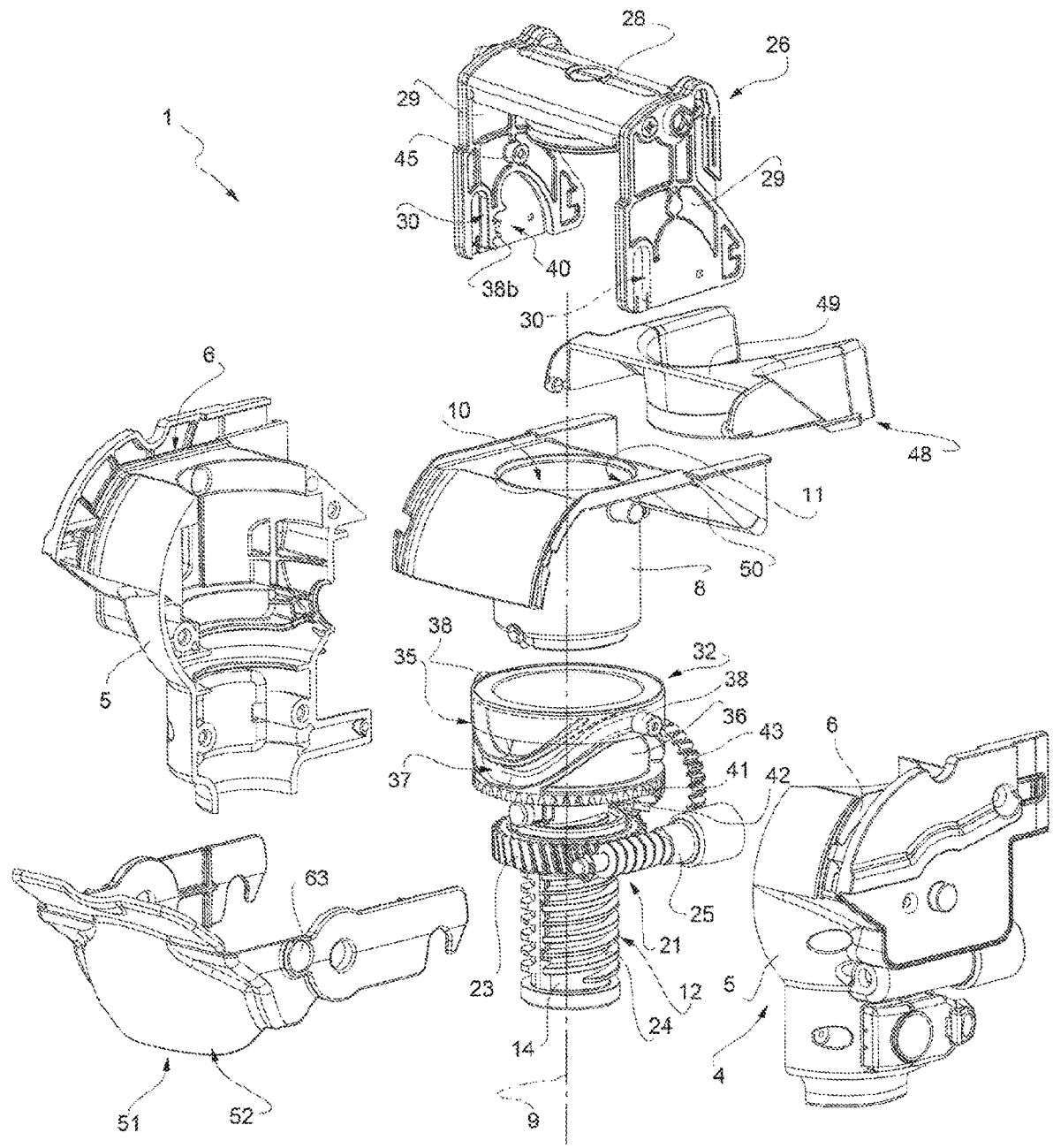
FIG. 2 is an exploded view of the brewing apparatus of FIG. 1.
Figure 4:
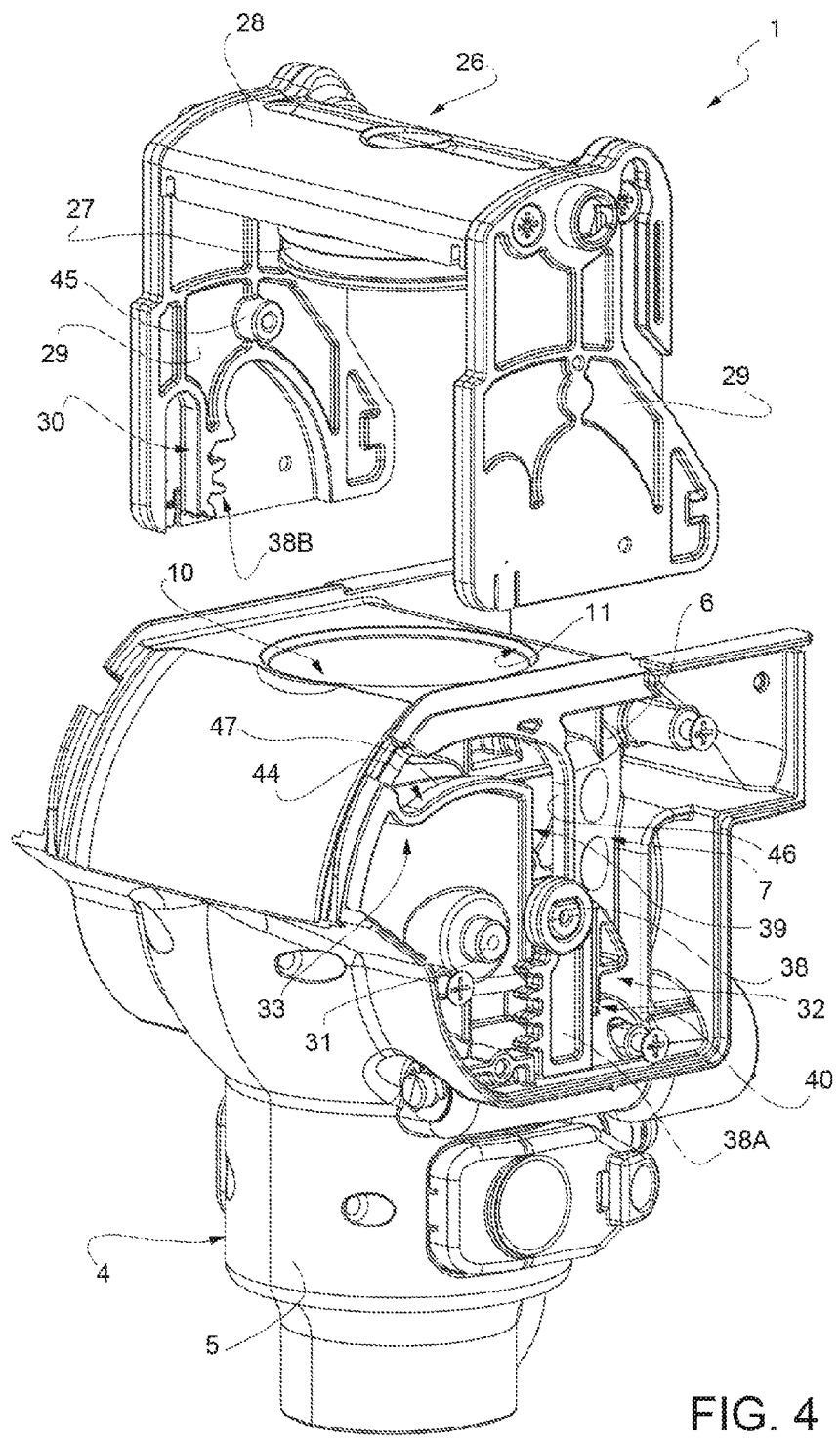
FIG. 4 shows, in a perspective and partly exploded view, the brewing apparatus of FIG. 1.

In accordance with what is shown in FIGS. 1, 2 and 4, the brewing device 1 comprises a frame 4 formed by two shells 5 firmly connected to each other and each of them having a lateral wall 6, which is opposite to the lateral wall 6 of the other shell 5 and is limited externally by a flat face 7 parallel to face 7 of the other lateral wall 6.

The two shells 5 define a space between them, inside which a cylindrical tubular body 8 is mounted, which has a longitudinal axis 9 and internally defines a brewing chamber 10 which communicates externally through an upper aperture 11 through which a material to be brewed may be loaded and discharged, and is closed below by a piston 12 for the compression/ejection of the material.

Figure 3:
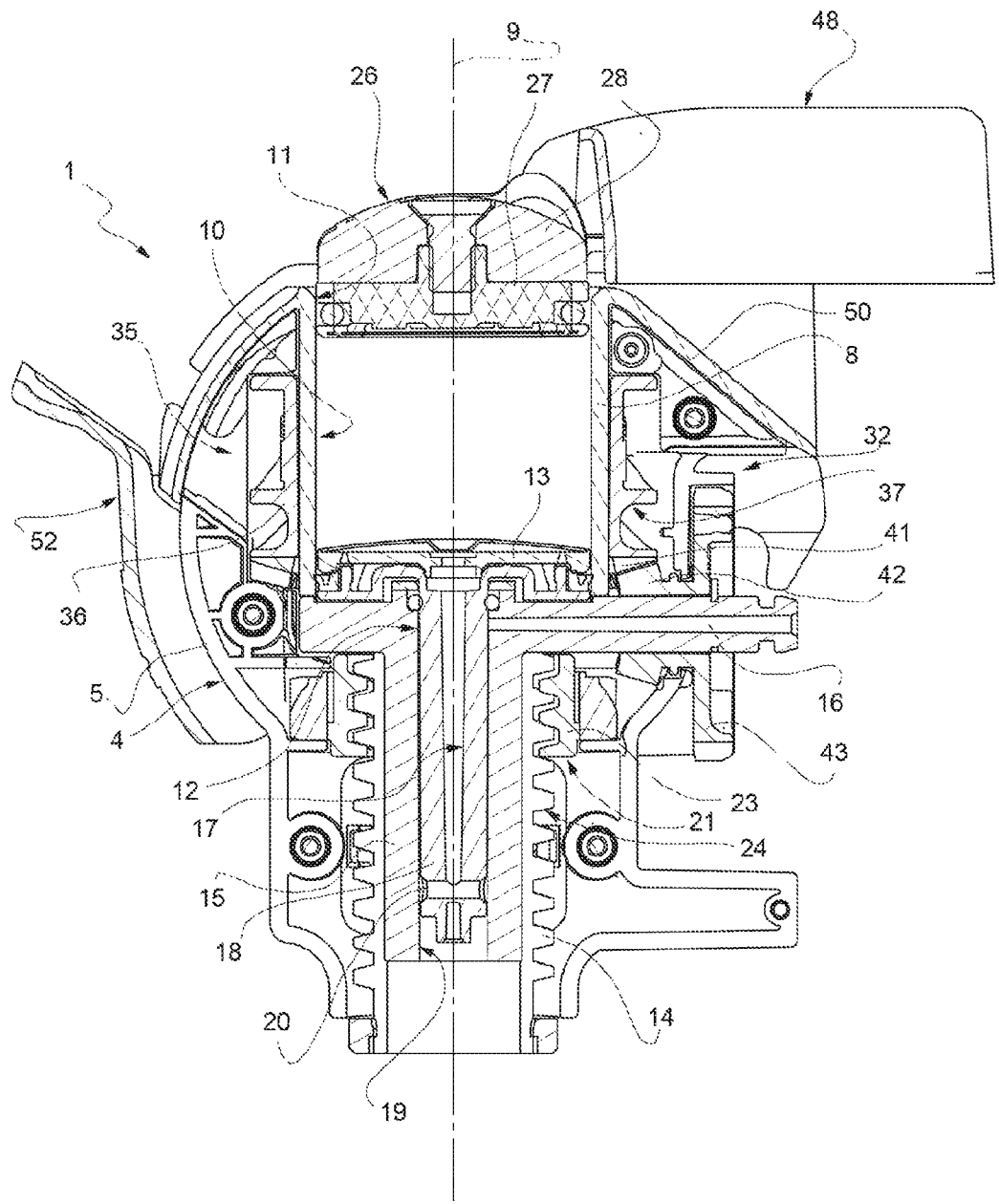
FIG. 3 shows a cross-sectional view, in accordance with a central plane of symmetry, of the brewing device of FIG. 1.

In accordance with what is shown in FIGS. 2 and 3, the piston 12 comprises a head 13 and a tubular rod 14, which is slidably mounted on a cylindrical body 15 integral with the frame 4 which is provided with two diametrically opposite transverse appendages which slidingly engage respective longitudinal slots of the rod 14. One of the two transverse appendages is full, while the other appendage is tubular and defines an inlet conduit 16 of the brewing water that, during operation, is supplied to the brewing chamber 10 by the piston 12.

To this purpose, the head 13 of the piston 12 is designed like a shower tray and is able to receive the brewing water from a supply channel 17, which is arranged in an elongated element 18 integral with the head 13 and slidably mounted inside an axial hole 19 of the cylindrical body 15, and has one or more transverse holes 20 communicating fluidly with an annular meatus positioned between the elongated element 18 and the hole 19. During operation, the brewing water enters the brewing device through the inlet conduit 16 and is distributed in the annular meatus to flow, finally, through the holes 20, into the supply channel 17 and, from there, into the brewing chamber 10.

The piston 12 is actuated by an actuating device 21 comprising a reversible electric motor (not shown) mounted on the support body 2 and a gear transmission comprising a toothed wheel 23 coaxial to the axis 9 and provided with an internal toothing meshing with an external thread 24 of the rod 14, and an external toothing meshing with an endless screw of a spindle 25 housed in a recess of the frame 4 and releasably coupled to a power take-off of said reversible electric motor.

In accordance with what is shown in FIGS. 1, 2, 3 and 4, the brewing device 1 further comprises a closing body 26, which is movable, with respect to the frame 4 and to the brewing chamber 10, away from and towards a closing position in which the closing body fluid-tightly closes the upper aperture 11, indicated below as a dispensing position, since the dispensing and the brewing of the beverage occur in said position.

In particular, the closing body 26 comprises a piston 27 and a portal supporting structure comprising a transverse 28, that is connected directly with the piston 27, and two guide plates 29, which extend downwardly from the ends of transverse 28 and are arranged facing one another and specular to each other in shape; consequently, below and where possible, only one of the two guide plates 29 will be described.

Each guide plate 29 is arranged facing face 7 of a respective lateral wall 6 and has a recess 30 slidingly engaged by a respective fulcrum pin 31 (visible in FIGS. 4, 5, and 6) carried by and projecting from the same lateral wall 6.

The closing body 26 is actuated and guided, during operation, by an actuating device 32 configured so as to translate and rotate the closing body 26 about the fulcrum pins 31 so as to enable it to arrange itself in the said closing position (FIGS. 3 and 6), in which the piston 24 fluid-tightly engages the aperture 11, in an opening position (FIGS. 1 and 5), in which the piston 27 leaves the aperture 11 completely free and is angularly spaced apart from the closing position, and in an intermediate position or in an position of ejection of the used material (not shown), in which the closing body 26 is raised with respect to the closing position and the piston 27 is external and axially aligned with the aperture 11.

To this purpose, the actuating device 32 comprises an electric motor (not shown), that is carried by the support body 2 and a transmission 35 arranged between the electric motor and the closing body 26.

The transmission 35 comprises a barrel cam 36 arranged around the brewing chamber 10 between the cylindrical tubular body 8 and the lateral walls 6 of the frame 4, in a position coaxial to the axis 9. The barrel cam 36 defines, on its lateral wall, a track 37 and comprises two cam followers (38), which engage the track 37 in diametrically opposite positions and extend specularly, in a direction transversal to axis 9, outwards from the barrel cam 36, through and beyond the respective lateral walls 6.

In particular, in accordance with what is shown in FIG. 7, the lateral walls 6 comprise respective slots 39 specular to one another, each of which extends in a direction parallel to the longitudinal axis 9 and is slidably engaged by a respective cam follower 38 to transform, during operation, a rotation of the barrel cam 36 about the axis 9 into a translational motion of the cam followers 38 along the axis 9.

Preferably, the two cam followers 38 are rigidly connected to each other by a support ring that is arranged coaxial to, and outside, the barrel cam 36 (FIG. 2). The support ring extends through the two cam followers 38 so as to identify, on each cam follower 38, a first end portion that extends radially towards the axis 9 and engages the track 37 of the drum cam 36, and a second end portion that is opposed and coaxial to the first portion and extends outwards. The provision of the support ring to connect the two cam followers 38 to each other has the advantage of eliminating, or at least limiting, any clearance between the cam followers 38 and the track 37, with resulting benefits for the accuracy of the transmission of motion. Alternatively, the two cam followers 38 can be physically separated from each other.

The transmission 35 also comprises a rack-and-pinion mechanism 40 and a cam control device 33, which are configured to transform the linear motion, along the slots 39, of the cam followers 38 into a movement of the closing body 26 consisting of a rotation around the fulcrum pins 31 and a translation parallel to the axis 9.

Figure 5:
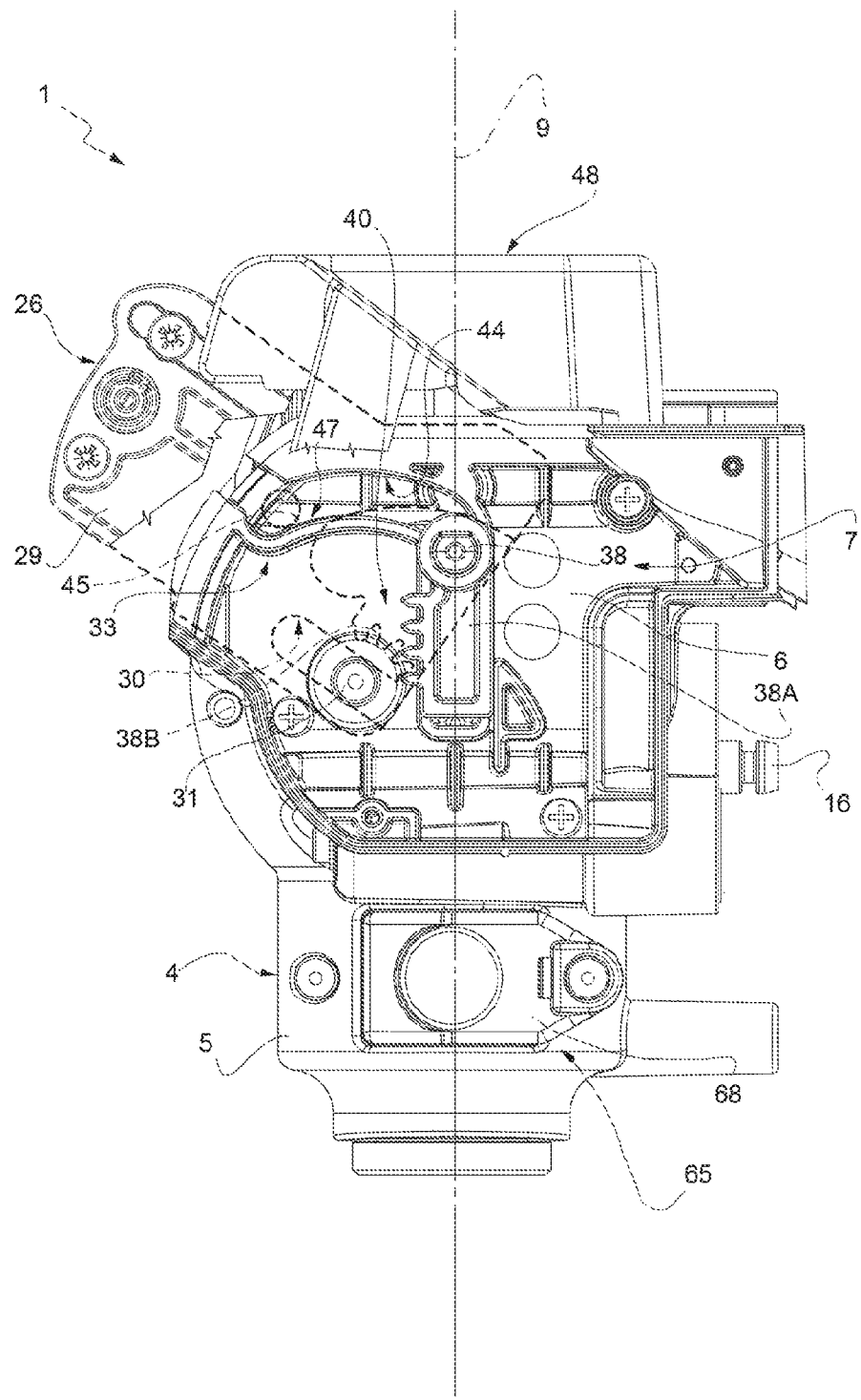
FIGS. 5 and 6 show, in a side elevation and with parts removed for clarity, the brewing apparatus of FIG. 14 in an open and closed configuration respectively.
Figure 6:
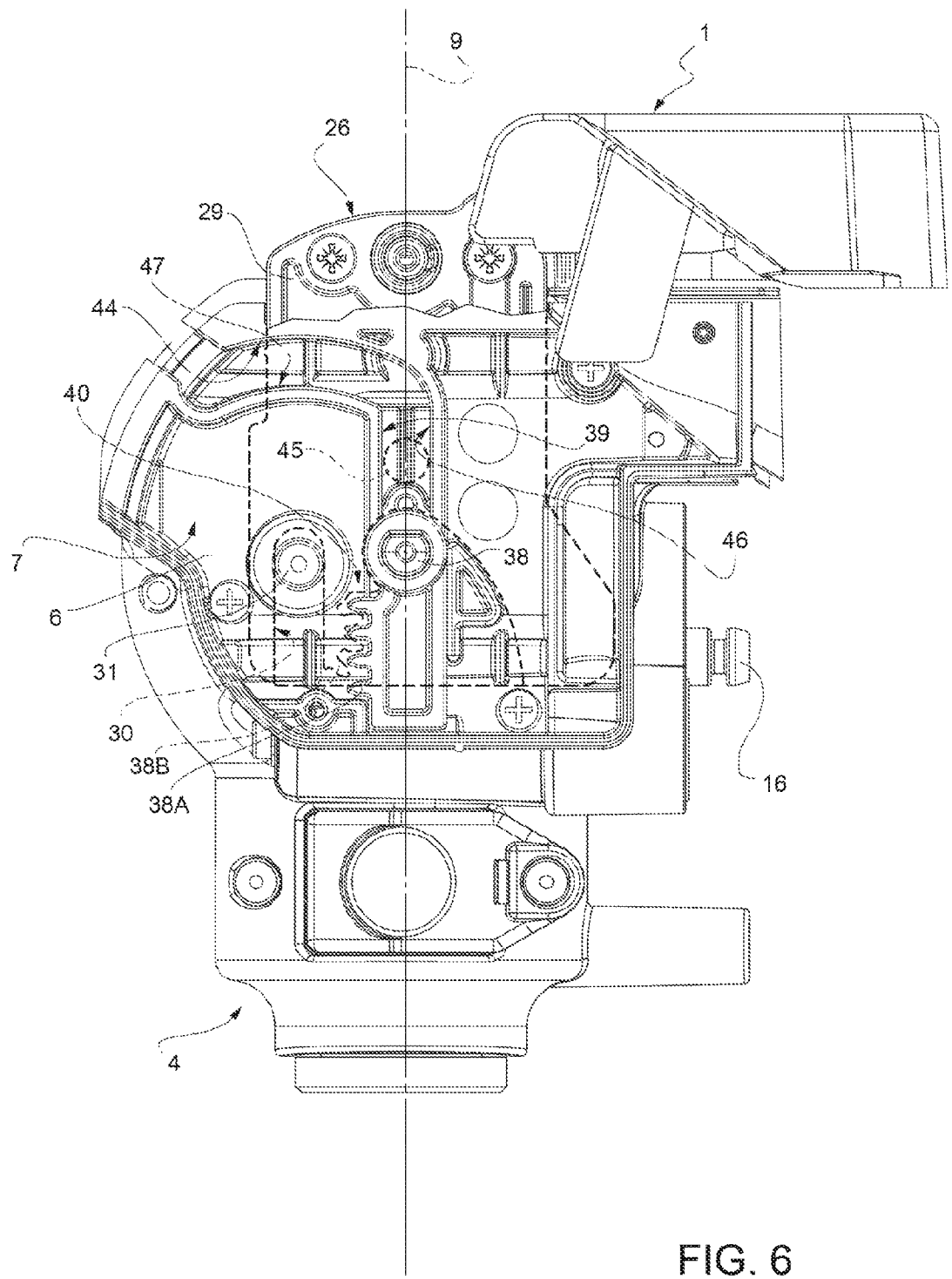

As shown in FIGS. 4, 5 and 6, the rack-and-pinion mechanism 40 comprises, for each cam follower 38, a rack 38A carried by a respective cam follower 38 and meshing with a toothed part 38B carried by a respective guide plate 29.

The rack 38A is preferably defined by a bar that is fixed, at its upper end, to the corresponding cam follower 38 and having, along a side edge, a rectilinear toothing, preferably with straight teeth, extending in a parallel direction to the longitudinal axis 9. The toothed part 38B is a circular toothed part, preferably with straight teeth.

Each toothed part 38B is arranged on an internal surface of the relative lateral wall 6 and faces a recess having an involute profile which, as will be seen below, is slidably engaged, during the opening and closing of the closing body 26, by the aforementioned upper end of the rack 38A mounted on the relative cam follower 38.

The racks 38A are moved by the barrel cam 36 through the cam followers 38 with a law of motion depending on the profile of the track 37 of the barrel cam 36 and on its rotation speed.

In accordance with a preferred embodiment, track 37 has a sinusoidal development with upper peaks defining the opening position of the closing body 26 and lower peaks defining the closing position.

In accordance with what is shown in the enclosed Figures, the profile of track 37 is preferably drawn in such a way that, during a complete rotation of the barrel cam 36 about the axis 9, clockwise or anticlockwise, the closing body 26 is moved from the opening position to the closing position and, vice versa, from the closing position to the opening position.

In accordance with what is shown in FIGS. 1 and 6, the barrel cam 36 is actuated by said actuating device 32 via a gear reducer mechanism comprising a toothed rim 41 integral with the barrel cam 36 and meshing with a pinion 42, which is supported by frame 4 and is angularly integral with a toothed wheel 43 able to receive the motion from an output of the above-mentioned electric motor associated with the actuating device 32.

In accordance with what is shown in FIG. 4, said control device 33 that controls the movement imparted to the closing body 26 by the rack-and-pinion mechanism 40 comprises two fixed tracks 44, each of which is arranged on the face 7 of a respective lateral wall 6 and is engaged by a cam follower 45 carried by the guide plate 29 arranged facing the lateral wall itself 6.

In order to guide the movement of the closing body 26 between said closing position, intermediate position and opening position, each track 44 comprises a rectilinear portion 46 parallel to the axis 9 and a circumferential arc portion 47 coaxial to the fulcrum pin 31.

According to the preferred embodiment shown in the attached Figures, each track 44 is made from a respective slot arranged in the corresponding lateral wall 6. Preferably, moreover, the rectilinear portion 46 of each track 44 is formed as a lengthening of the corresponding slot 39. In a different form of construction not shown, the track 47 and the corresponding slot 39 can be separated.

In accordance with what is shown in FIGS. 1 and 2, the brewing device 1 further comprises a scraper element 48 movable with the closing body 26 to discharge the used material ejected from the brewing chamber 10 by the piston 12 at the end of the preparation of the beverage.

The scraper device 48 is U-shaped, it is hinged on the guide plates 29 and comprises two supporting lateral arms connecting the respective opposite ends of a blade 49 able to move itself onto aperture 11 when the closing body 26 moves from the opening to the intermediate position so as to push the used material above a slide 50 connected with the top of the tubular body 8 and thus making it fall into the discharge channel 3.

Finally, the brewing device 1 comprises a fastening device 51 to connect releasably the brewing device 1 to the support body 2.

In accordance with what is shown in FIGS. 1, the fastening device 51 comprises a release lever 52, which is hinged to the frame 4 to rotate about an axis transversal to the axis 9 between a normal connection position (FIG. 3), in which the brewing device 1 is firmly fastened to the support body 2, and a release position (FIG. 4), in which the brewing device 1 is free to be rapidly installed and removed from the support body 2.

Besides the release lever 52, the fastening device 51 comprises a locking mechanism 62 able to prevent an accidental removal of the release lever 52 from the connection position when the brewing device 1 is mounted onto the support body 2 (FIG. 3) so as to ensure the stability of the connection and, at the same time, make the disconnection operations simple and rapid and, in particular, the repositioning of the brewing device 1 through the actuation of the release lever 52. The locking mechanism 62 is magnetic and comprises, for each rocker bar 53, a magnet 63 connected to the rocker bar 53 and a magnet 64 connected to the corresponding outer wall 54.

The operation of the brewing device 1 during a preparation cycle of a beverage will be described below with reference to FIGS. 5 and 6.

FIG. 5 shows the brewing device 1 at the beginning of a preparation cycle. In this position, the piston 12 is arranged at the bottom of the brewing chamber 10, the closing body 26 is in the opening position, the cam followers 38 of the barrel cam 36 are arranged at the upper ends of the slots 39, and the cam followers 45 carried by the guide plates 29 are arranged, along the tracks 44, at the end of the arc portion 47 furthest from the rectilinear portion 46.

Once the loading of the material to be brewed has been carried out, the motor of the actuating device 32 is activated to bring the closing body 26 into its closing position. During this passage, the cam followers 38 with their respective racks 38A lower themselves along the slots 39 under the thrust of the barrel cam 36 and, as a result of the meshing of the racks 38A with the respective toothed parts 38B, they impart a rotation to the plates 29 about the fulcrum pins 31, which rotation is controlled by the interaction between the cam followers 45 and the tracks 44, with the consequent movement of the closing body 26 from the opening position to the intermediate position, in which the racks 38A and the corresponding toothed parts 38B are arranged at the end of the run.

At this point, thanks to the coupling between the teeth of the racks 38A and the teeth of the respective toothed parts 38B and to the interaction between the upper ends of the racks 38A with the respective recesses engaged by them, an additional lowering of the racks 38A causes the guide plates 29 to be moved downwards with a consequent movement of the closing body 26 from the intermediate position to the closing position (FIG. 6).

In accordance with what is shown in FIG. 6, in the closing position of the closing body 26, the cam followers 38 with the respective racks 38A are arranged at the lower ends of the slots 39, and the cam followers 45 carried by the guide plates 29 are arranged, along the tracks 44, at the ends of the rectilinear portion 46 that is furthest from the arc portion 47.

Once the closing body 26 is carried to the closing position and the actuating device 32 is deactivated, the actuating device 21 is activated to lift the piston 12 and compress the material to be brewed. Some pressurised hot water is subsequently supplied inside the brewing chamber 10 through the conduit 16, the channel 17 and the head 13 of the piston 12 to brew the material with resulting production of the beverage, that exits through the piston 27 and a dispensing conduit 70 carried by the closing body 26 (FIG. 3).

After dispensing, the barrel cam 36 is actuated again to rotate around the axis 9 and to move the closing body 26 to the opening position.

Starting from the position shown in FIG. 6, the upward movement of the racks 38A initially causes the plates 29 to be moved upwards thanks to the coupling between the teeth of the racks 38A and the teeth of the respective toothed parts 38B, and thanks to the interaction between the upper ends of the racks 38A with the respective recesses engaged by them. Subsequently, when the cam followers 45 reach the end of the rectilinear portion 46 and start to move along the arc portion 47 of the relative tracks 44, the upward movement of the racks 38A determines the rotation of the plates 29; this rotation is driven by the meshing between the racks 38A with their respective toothed parts 38B and is controlled by the sliding of the cam followers 45 in their respective tracks 44.

Subsequently, in order to discharge the used material, the closing body 26 is returned to the closing position, or, as will be seen below, to the intermediate position, so as to push the used material into the discharge channel 3, through the scraper element 48; the used material is raised to the mouth of the brewing chamber 10 through raising the piston 12.

Regarding the above-mentioned it should be specified that the actuation of the closing body 26 through the barrel cam 36 enables to move in turn the closing body 26 between the opening and the closing position rotating the barrel cam 36 always in the same direction of rotation. However, it is possible to control the barrel cam 36 so as to reverse its rotation direction as required. For example, the rotation of the barrel cam 36 can be usefully reversed when the closing body 26 reaches the intermediate position to discharge the used material so as to carry back the closing body 26 to the opening position without necessarily passing through the closing position.

What is claimed is:

1. A brewing device for a beverage preparation machine, in particular coffee or tea, the brewing device comprises:
   a frame;
   a brewing chamber carried by the frame and having a longitudinal axis and a loading/unloading aperture for a brewable material;
   a closing body movable relative to the frame to displace between a closing position, in which the closing body fluid-tightly closes the aperture and an intermediate position, in which the closing body is raised along the longitudinal axis relative to the closing position, and to rotate between the intermediate position and an opening position, in which the closing body is angularly offset relative to the closing position; and
   an actuator device to move the closing body and a motorized transmission;
   wherein the frame further comprises two side walls arranged on opposite sides of the brewing chamber and associated facing slots parallel to the longitudinal axis, and two fulcrum pins projecting from the side walls and on which the closing body is hinged;
   wherein the closing body further comprises two guide plates, each of which faces a respective side wall and has a recess slidably engaged by a respective fulcrum pin to allow each of the guide plates to slide on, and rotate about, the fulcrum pin and the closing body to move between the closing, intermediate and opening positions;
   wherein the motorized transmission comprises two transmission pins, each of which extends transversally to the longitudinal axis through a respective slot in each of the side walls of the frame and up to each of the guide plates facing each of the side walls of the frame;
   wherein the motorized transmission further comprises a rack-and-pinion mechanism comprising a driving toothing carried by the frame, and a driven toothing carried by the closing body and meshing with the driving toothing to move the closing body from and to the closing position;
   wherein the driving toothing further comprises a pair of toothed racks, each of which is carried by a respective transmission pin and extends parallel to the longitudinal axis; and
   wherein the driven toothing further comprises a pair of circular toothed sectors, each of which is carried by a respective guide plate and meshes with a corresponding toothed rack to transform a linear displacement of the toothed rack along the longitudinal axis into a rototranslatory motion of the closing body.

2. The brewing device of claim 1, wherein the toothed racks mesh with the toothed sectors so that:
   displacement of the toothed racks along a first part of the slots causes a rotation of the toothed sectors about the fulcrum pins and, resultingly, a rotation of the closing body between the opening and intermediate positions; and
   displacement of the toothed racks along a second part of the slots causes the displacement of the toothed sectors together with the toothed racks, and resultingly, the displacement of the closing body between the intermediate and closing positions.

3. The brewing device of claim 2, wherein each toothed rack is defined by a bar which is fixed at an upper end to the respective transmission pin and has along a side edge a linear toothing extending parallel to the longitudinal axis and meshing with the respective toothed sector.

4. The brewing device of claim 1, wherein each toothed rack is defined by a bar which is fixed at an upper end, to the respective transmission pin and has, along a side edge a linear toothing extending parallel to the longitudinal axis and meshing with the respective toothed sector.

5. The brewing device of claim 1, wherein the motorized transmission further comprises a barrel cam coupled to the rack-and-pinion mechanism, and a first track coaxial to the longitudinal axis, and a tappet comprising two cam-followers, each of which is defined by each of the transmission pins and extends through a respective slot so that during operation a rotation of the barrel cam about the longitudinal axis results in a linear displacement of the cam-followers along the respective slots.

6. The brewing device of claim 5, wherein the first track has a profile that is designed so that a complete rotation of the barrel cam results in a displacement of the closing body from the opening position to the closing position and again from the closing position to the opening position.

7. The brewing device of claim 6, wherein the first track has a sinusoidal profile, with a plurality of higher peaks thereof corresponding to the opening position of the closing body, and with a plurality of lower peaks thereof corresponding to the closing position of the closing body.

8. The brewing device of claim 1, wherein the motorized transmission further comprises a cam control device to control the movement of the closing body, wherein the cam control device further comprises two third tracks, each of which is formed in the respective side walls and is engaged by a respective further cam-follower carried by each of the guide plates facing each of the side walls.

9. A beverage preparation machine, comprising the brewing device of claim 1.

\* \* \* \* \*